United States Patent
Rao

(10) Patent No.: US 6,920,155 B2
(45) Date of Patent: Jul. 19, 2005

(54) EMBEDDED LOOP DELAY COMPENSATION CIRCUIT FOR MULTI-CHANNEL TRANSCEIVER

(75) Inventor: Manjuprakash Rama Rao, Bangalore (IN)

(73) Assignee: Zarlink Semiconductor, Inc., Kanata (CA)

( * ) Notice: Subject to any disclaimer, the term of this patent is extended or adjusted under 35 U.S.C. 154(b) by 813 days.

(21) Appl. No.: 09/796,782

(22) Filed: Mar. 1, 2001

(65) Prior Publication Data

US 2001/0040902 A1 Nov. 15, 2001

(30) Foreign Application Priority Data

Mar. 3, 2000 (GB) .............................. 0005064

(51) Int. Cl.⁷ .................................. H04J 3/06
(52) U.S. Cl. ....................................... 370/503
(58) Field of Search ................... 370/503, 506, 370/507, 508, 509, 512, 516, 517, 519

(56) References Cited

U.S. PATENT DOCUMENTS

| | | | | |
|---|---|---|---|---|
| 4,807,259 | A | | 2/1989 | Yamanaka et al. |
| 5,404,575 | A | * | 4/1995 | Lehto .......................... 455/502 |
| 5,809,093 | A | * | 9/1998 | Cooper ........................ 370/514 |
| 6,014,376 | A | * | 1/2000 | Abreu et al. ................. 370/350 |
| 6,430,241 | B1 | * | 8/2002 | Rupprecht et al. ........... 375/358 |
| 6,452,946 | B1 | * | 9/2002 | Manzardo .................... 370/487 |
| 6,483,825 | B2 | * | 11/2002 | Seta ............................ 370/335 |
| 6,647,246 | B1 | * | 11/2003 | Lu ............................ 455/67.11 |
| 2002/0012362 | A1 | * | 1/2002 | Yahata et al. ................ 370/503 |

FOREIGN PATENT DOCUMENTS

| | | | |
|---|---|---|---|
| EP | 0634851 | A2 | 1/1995 |
| EP | 0634851 | * | 1/1995 |
| GB | 2 321 829 | A | 8/1998 |
| WO | WO 99/33207 | | 7/1999 |
| WO | WO 01/10154 | | 2/2001 |

OTHER PUBLICATIONS

Mouly, M., Pautet, M–B.; The GMS System for Mobile Communications; 1992; pp 268–281; Cell & Sys; Palaiseau, FRANCE.

Ariyavisitakul, S. et al; Network Synchronisation of Radio Ports in Wireless Personal Communications; Electronics Letters; Dec. 3, 1992; pp. 2312–2314; vol. 28, No. 25; IEE Stevenage, GB.

Mccrady, D. et al; Mobile Ranging with Low Accuracy Clocks; Radio and Wireless Conference, 1999, RAWCON 99, 1999 IEEE, Denver, Colorado—Aug. 1–4, 1999, IEEE, Piscataway, New Jersey—Aug. 1, 1999; pp. 85–88.

* cited by examiner

Primary Examiner—Chi Pham
Assistant Examiner—Anh-Vu Ly
(74) Attorney, Agent, or Firm—Lawrence E. Laubscher, Jr.

(57) ABSTRACT

A circuit for measuring and compensating for propagation delays in a communication system is described. In communication systems such as wireless networks a number of base stations operate within cells to provide wide area coverage. In such systems a base station controller will communicate with each base station to provide certain information including a synchronizing time stamp. When the distance between the base station controller and each of the individual base stations is not a constant a propagation delay introduced by this distance differential will mean that the time stamp transmitted from the base station controller will not reach all the base stations at the same time. This invention relates to a system and method of measuring respective propagation delays and for introducing a compensating value.

9 Claims, 4 Drawing Sheets

EMBEDDED LOOP DELAY COMPENSATION CIRCUIT FOR MULTI-CHANNEL TRANSCEIVER

FIELD OF THE INVENTION

This invention relates to communication networks including but not limited to cellular based networks and, more particularly, to systems and methods of measuring and compensating for variations in the propagation delay values between a base station controller and respective base stations where the distances between the base station controller and the base stations are not the same.

BACKGROUND

Communication networks, such as cellular based systems, typically have a plurality of cellular areas or cells wherein each cell provides service to a substantially circular geographical area. A base station is usually positioned centrally within the cell and is configured to conduct bi-directional communication with mobile or fixed remote cites within its coverage area. In a large geographical region a plurality of cells are arranged in a partially overlapping configuration to provide broad and continuous coverage to the area.

Typically, a base station controller will provide overall control of all the base stations in a particular geographical region or metropolitan area. One of the many functions of the base station controller is to provide a time stamp or synchronization signal to each base station in order that all units in the geographical area will have a common clock.

The base station controller will often be associated with one of the base stations in the geographic area, but it may also be at a location remote from all of the base stations. In any event, the distance between the base station controller and each of the base stations in the local geographic area controlled by the controller is unlikely to be exactly the same.

As noted above, the reference clock for each base station is derived from a master clock that is typically associated with the base station controller. Since the distance from the base station controller to each base station is not the same any propagation delay in the communication link (T1, E1, etc.) between the base station controller and each base station will mean that the time stamp for each base station will not be synchronized.

In prior art solutions, dedicated circuitry was included external to a multi-channel transceiver at the base station controller in an attempt to provide synchronization. In such systems proprietary hardware and software methods were used to achieve the required functionality. Alternatively, global position systems (GPS) based schemes have been used in certain implementations for achieving a similar functionality.

SUMMARY OF THE INVENTION

The present invention is intended to solve certain aspects of synchronization between base stations in situations where multiple base stations are connected to a single base station controller using, for example, E1 links and specifically wherein the electrical links between the base station controller and individual base stations are of different lengths.

The present invention presents a formal approach to solving the above-identified problem. An embedded protocol within the multi-channel transceiver defines the required handshaking between the base station controller and the individual base stations using FAS/NFAS word bits, and in particular, the Sa-bits which allow for a non-intrusive method of propagation delay measurement. This provides an enhanced accuracy as well as an extended range of propagation delay measurement. Further integration of the measurement circuit in a multi-channel transceiver leads to an implementation which is highly suitable for base station controller to base station connectivity.

Therefore, in accordance with a first aspect of the present invention there is provided a method of measuring propagation delay between nodes in a communications network comprising: transmitting a loop delay measurement signal from a first node to a second node over a communication link; receiving the measurement signal at the second node and returning the signal to the first node together with an embedded value of a turn around delay time determined at the second node; receiving the measurement signal and embedded turn around time at the first node; and calculating the inter-node round trip propagation delay by measuring the total delay time less the turn around time.

In accordance with a second aspect of the present invention there is provided a method of computing respective relative propagation delays between a base station controller and a plurality of base stations in a communications system comprising: transmitting a message signal from the base station controller to each of the base stations over respective communication links; receiving the message at each base station and each base station returning the message to the base station controller, receiving the returned messages at the base station controller; determining which base station to base station controller link has the greatest propagation delay; and comparing the propagation delay of each link with the link having the greatest delay.

In accordance with a further aspect of the present invention there is provided a method of compensating for different propagation delay times between a base station controller and a plurality of base stations in a communications network comprising: transmitting a common HDLC timing message from the base station controller to each of the base stations over respective communication links; returning the timing message from each base station to the base station controller; determining the respective round trip propagation time from the base station controller to each of the base stations; and adding a delay component to a timing signal for each link based on the respective round trip propagation times whereby each base station receives a synchronized time stamp.

In accordance with another aspect of the invention there is provided a system for measuring propagation delay between nodes in a communications network comprising: a transmitter at a first node for transmitting a loop delay measurement signal from the first node to a second node over a communication link; a receiver at the second node for receiving the measurement signal and returning it to the first node together with an embedded value of a turn around delay time determined at the second node; receiving means at the first node for receiving the measurement signal and embedded turn around time; and calculation means at the first node for calculating the propagation delay by measuring the total delay time less the turn around time.

In accordance with another aspect of the invention there is provided a system for computing respective relative propagation delays between a base station controller and a plurality of base stations in a communications system comprising: a transmitter at the base station controller for transmitting a message signal from the base station controller to each of the base stations over respective communication links; a receiver at each base station for receiving the message at each base station and for returning the message to the base station controller; receiving means at the base station controller for receiving the returned message; determining means at the base station controller for determining which base station to base station controller link has the greatest propagation delay; and means to compare the propagation delay of each link with the link having the greatest delay.

In accordance with a still further aspect of the invention there is provided a system for compensating for different propagation delay times between a base station controller and a plurality of base stations in a communications network comprising: a transmitter at the base station controller for transmitting a common HDLC timing message from the base station controller to each of the base stations over respective communication links; means at each base station for returning the timing message from each base station to the base station controller; determining means at the base station controller for determining the respective round trip propagation time from the base station controller to each of the base stations; and delay means for adding a delay component to a timing signal for each link based on the respective round trip propagation times whereby each base station receives a synchronized time stamp.

BRIEF DESCRIPTION OF THE DRAWINGS

The invention will now be describer in greater detail with reference to the attached drawings wherein.

DETAILED DESCRIPTION OF THE INVENTION

Figure 1:
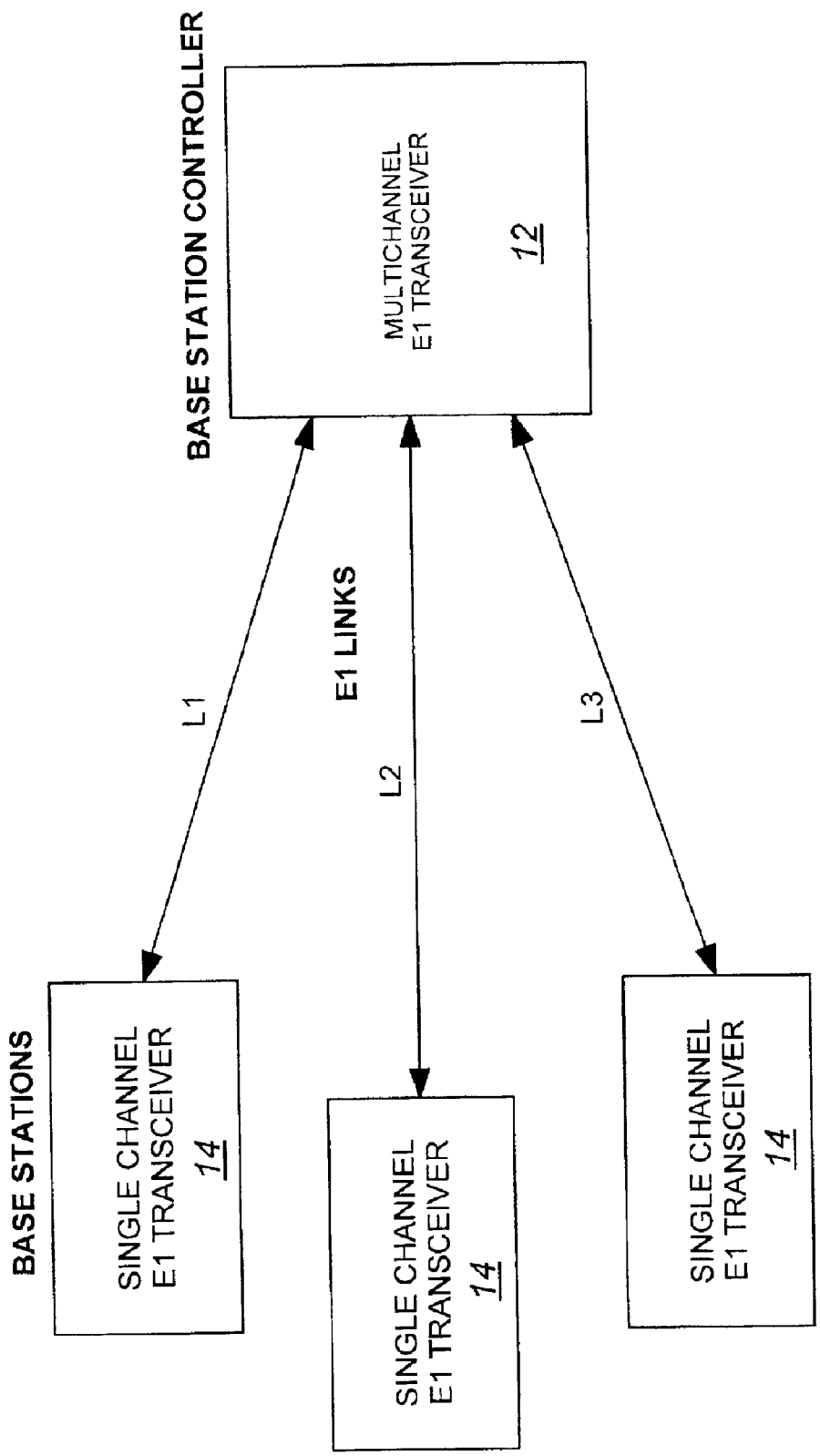
FIG. 1 is a high level reference model of the base station controller/base station system according to the present invention.

The concept presented for loop delay compensation according to the present invention is illustrated broadly in the reference model illustrated in FIG. 1. The Base Station Controller (BSC) 12 may have a multi-channel E1 (or T1) transceiver and is connected to the base stations 14 through E1 (T1) links L1 to L3. The Base Stations (BS) 14, as will be apparent to one skilled in the art, could have a single or multi-channel transceivers but for simplicity a single channel is illustrated in FIG. 1 (E1 is used in the model). The multi-channel transceiver in the BSC is normally the master and each of the base stations derives its synchronization timing from the master. The derived timing is used, for example, to drive a radio circuitry in the base stations. Certain radio schemes require that the radio frames transmitted from the different base stations be synchronized. Examples of such schemes include wireless technologies such as DECT, PHS, PCS, etc.

As discussed above the distances between the individual base stations and the base station controller are likely to be different and this, of course, is dependent upon the network layout. This present invention provides an implementation method wherein a compensation process is performed at the BSC to make sure that an alignment of timing frames exist at all the base stations despite a differential in loop lengths.

Figure 2:
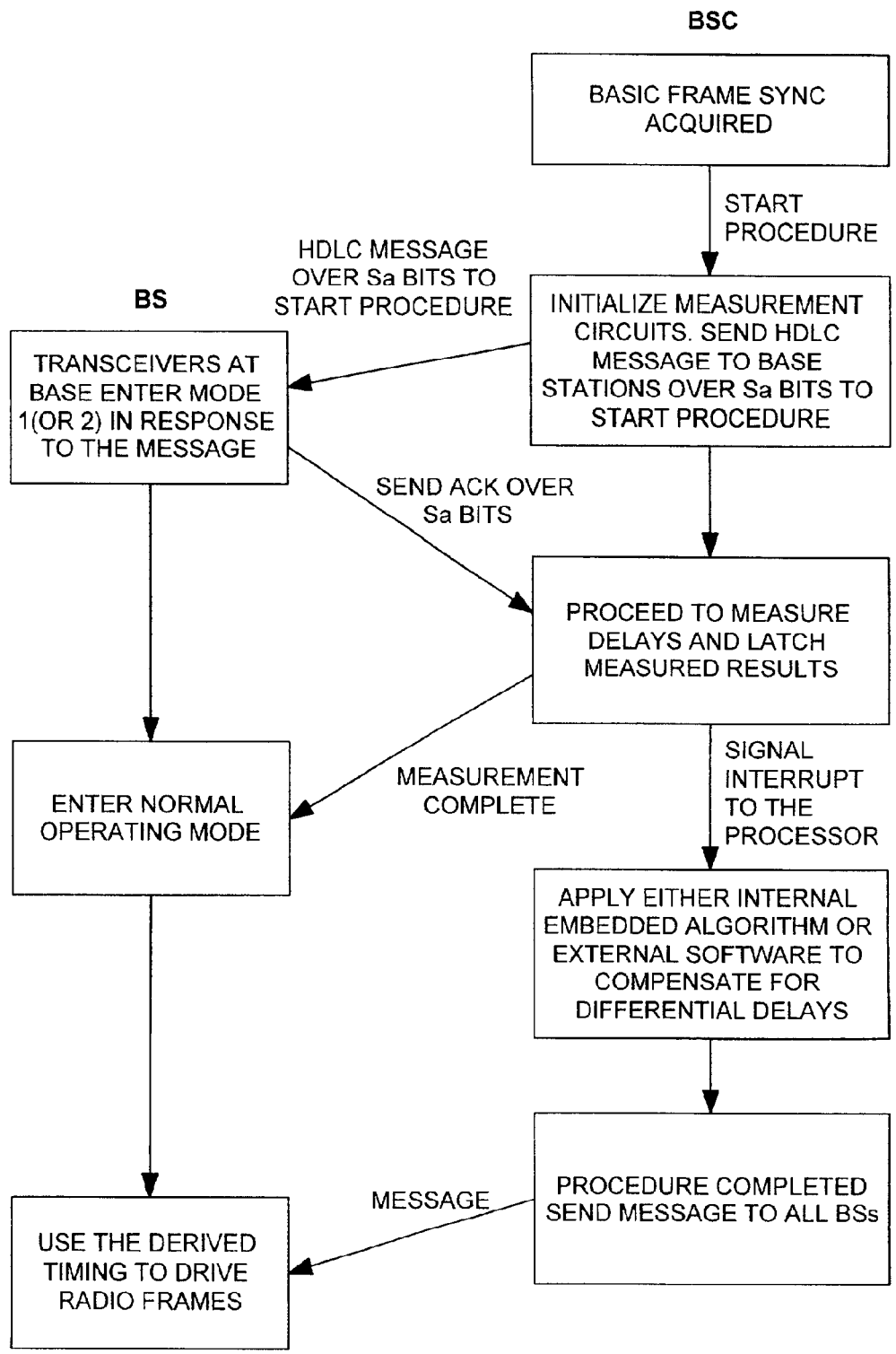
FIG. 2 is a flow chart illustrating the protocol for propagation delay measurements and timing adjustment.

The protocol between the BSC and the BS for the purpose of delay measurement and adjustment is explained in detail below in conjunction with the flow diagram of FIG. 2.

The initiation of the loop delay measurement at the master end (BSC) could be initiated by the system controller or could be a part of an initialization procedure in the device depending upon the mode selection control inputs. The procedure is initiated after the master end acquires a basic frame alignment on the selected links from the base stations.

The FAS/NFAS Sa bits are used to transmit (or broadcast) an HDLC based message towards the selected base stations. Since the BSC and BS are typically supplied by the same vendor in most of the cases it is assumed that the use of the Sa bits in this situation will not be problem. In this implementation the use of Sa bits does not create additional bandwidth for the measurement purpose and will allow payload timeslots to operate normally in both BSC to BS and BS to BSC directions under Mode 1 or normal operation as explained below. However, Mode 2 operation requires a remote loop back at the BS and this will disrupt the BS to BSC communication.

At the base stations the reception of an HDLC message on the Sa bits will cause the transceiver to enter either Mode 1 or Mode 2 operation wherein the frames transmitted toward the BSC will have a fixed offset with respect to the incoming frames. This fixed offset will be the same at all the base stations so that the compensation process is applied to account for skews in the propagation delay only and not for delays arising out of device related factors (i.e jitter attenuators, slip buffers, etc). The transceivers at the BSs indicate to the BSC that they have entered either Mode 1 or Mode 2 (i.e. remote loop back) by sending an acknowledgment (ACK) message over the Sa bits towards the BSC.

The BSC proceeds to make delay measurements based on the round trip value and latches the results respecting the selected links. These delay values can be processed in hardware using an embedded algorithm for normalization and automatically program the delay blocks in the transmit paths toward BSC-to-BS links. Another option is to interrupt the system controller and process the delay values by system software.

Following successful normalization a message is sent across from BSC to BS. The base stations can start using the derived timing from the links to drive the RF transceiver for communication with mobile sites. Verification or further iterations can be done by repeating the propagation delay measurement.

As a variant of the above scheme the BSC can instruct the base stations to advance or delay the RF frame by suitable bit times using the aforementioned Sa bits.

Figure 3:
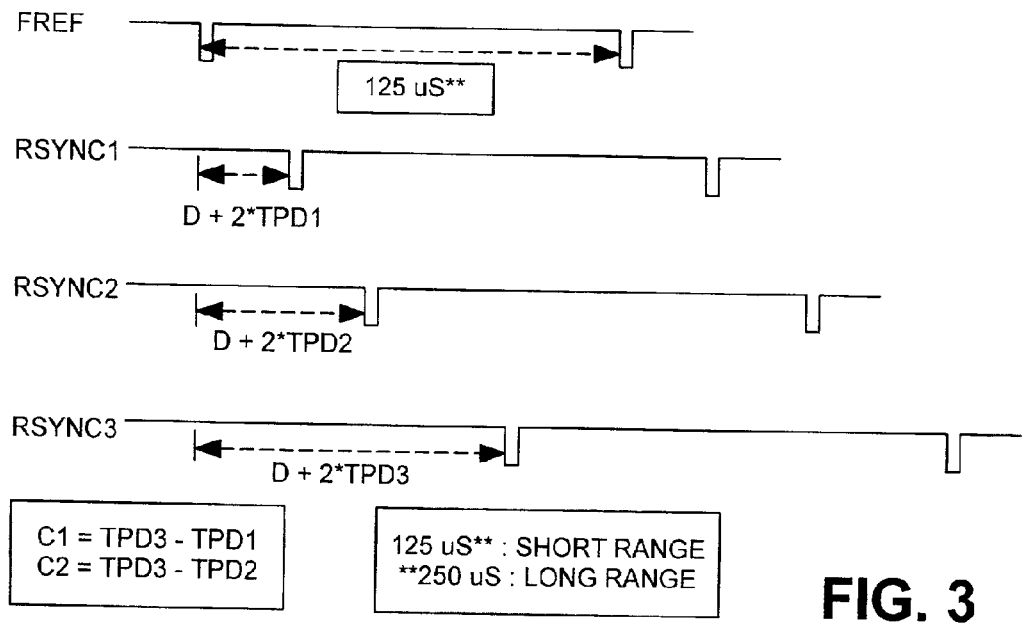
FIG. 3 is a timing diagram showing the device delays and the round trip propagation delays.

The three main aspects of the implementation details for the present invention can be summarized as: round trip propagation delay measurement; an algorithm to compute individual link delays; and compensation of the delays on individual links For the round trip propagation delay measurement (E1 case), it is assumed that the typical loop length between the BSC and the BS is in the order of a few kilometers (say 10). Assuming a 5 uS/Km delay factor a maximum round trip delay of 100 uS will be experienced in a 10 Km loop. FIG. 3 shows a typical timing diagram. The Fref in the top line is the reference frame pulse in a multi-channel device that is input on the system side. The 125 uS period is based on an 8 kHz reference signal. The timing diagram of FIG. 3 assumes that the recovered frame synchronization signals (rsysnc1 to rsysnc3) in the BS to BSC direction arrive before the occurrence of the next frame pulse on Fref, i.e. it is assumed that the round trip propagation delays plus the device delays (D) is less than 125 uS on all the links. (This assumption would be true in most of the cases however an alternative method is explained in the following paragraph for the cases where the "rsysnc" signal arrives after the next pulse on Fref.). It can be observed in FIG. 3 that the link #3 has the maximum propagation delay. Therefore, if delay factors having the values C1 and C2 are inserted in the link #1 and link #2 respectively then received frames at base stations (1 to 3) will all be aligned with one another.

An alternative method is to select a 4 KHz frame reference signal (FAS or NFAS in E1) so that the recovered frame synchronization signals (rsync1 to rsync 3) will have a period of 250 uS. This method will provide an accurate estimation of round trip propagation delay measurement for delays greater than 125 uS. It should be noted that a payload loop back (BSC->BS->BSC) will be required for this method to be successful.

Figure 4:
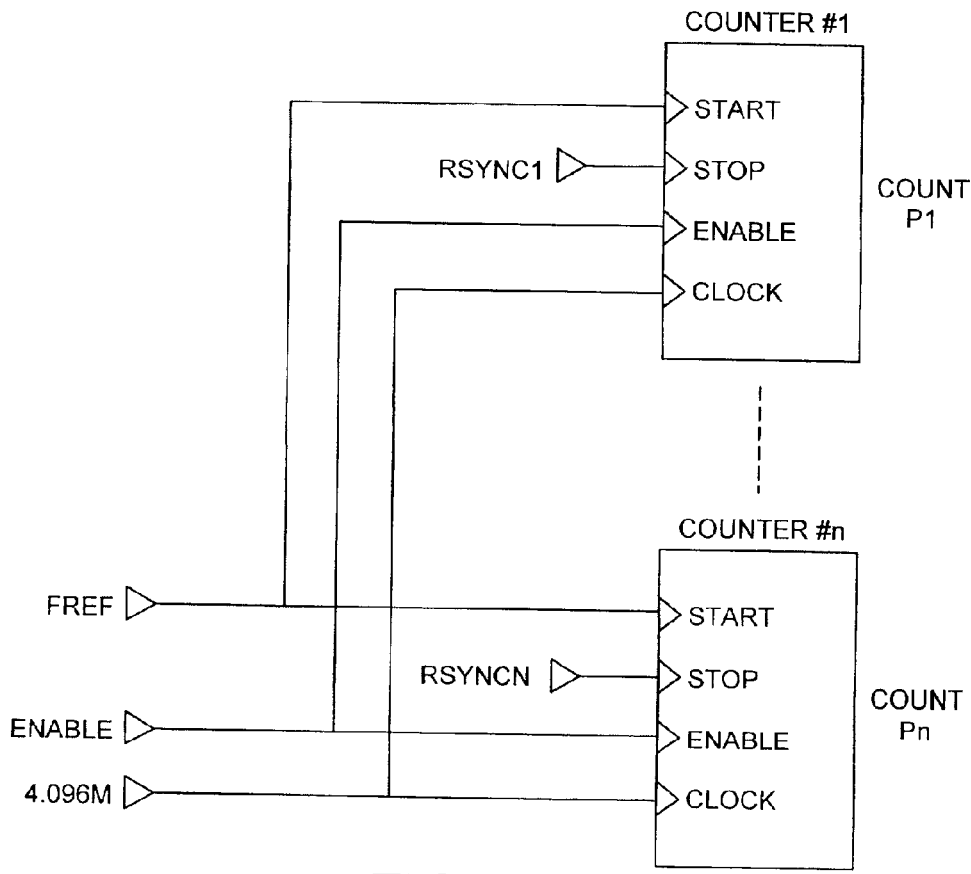
FIG. 4 is a block diagram of a hardware implementation according to one embodiment of the invention.

FIG. 4 shows a physical embodiment of a propagation delay measurement implementation built-into the multi-channel E1 transceiver and is applicable for both the values of Fref (i.e. 8 kHz or 4 kHz). Each of the framers in the multi-channel device has a corresponding counter, counter I to counter n. In this implementation a 4.096 MHz clock is used for counting. The Fref and Rsync signals are used to start and stop the counter. In addition there is a global enable. The arrival of the rsysnc pulses will stop the counters and the values P1 to Pn representing the number of 4.096 MHz clock pulses occurring in the interval between Fref and Rsync will be latched and used in further computations.

The algorithm for computation of individual link delays can be implemented by either built in hardware or software. The aim here is to compute the additional delays which has to be introduced in the [n−1] links of BSC to BSs paths to align the received E1 frame pulses at the BSs.

| Algorithm for computation |
| --- |
| Pm = Max (P1, P2 . . . Pn) |
| Cn = (Pm ~ Pn)/2 |

In the above algorithm Pm is the maximum count representing the link for which the most 4 MHZ clock pulses were counted during the interval. The delay value C for link n is Pm less the count for that particular link (Pn) divided by 2. The values C1 to Cn are the results of each of the computations for link #1 to link #n.

Figure 5:
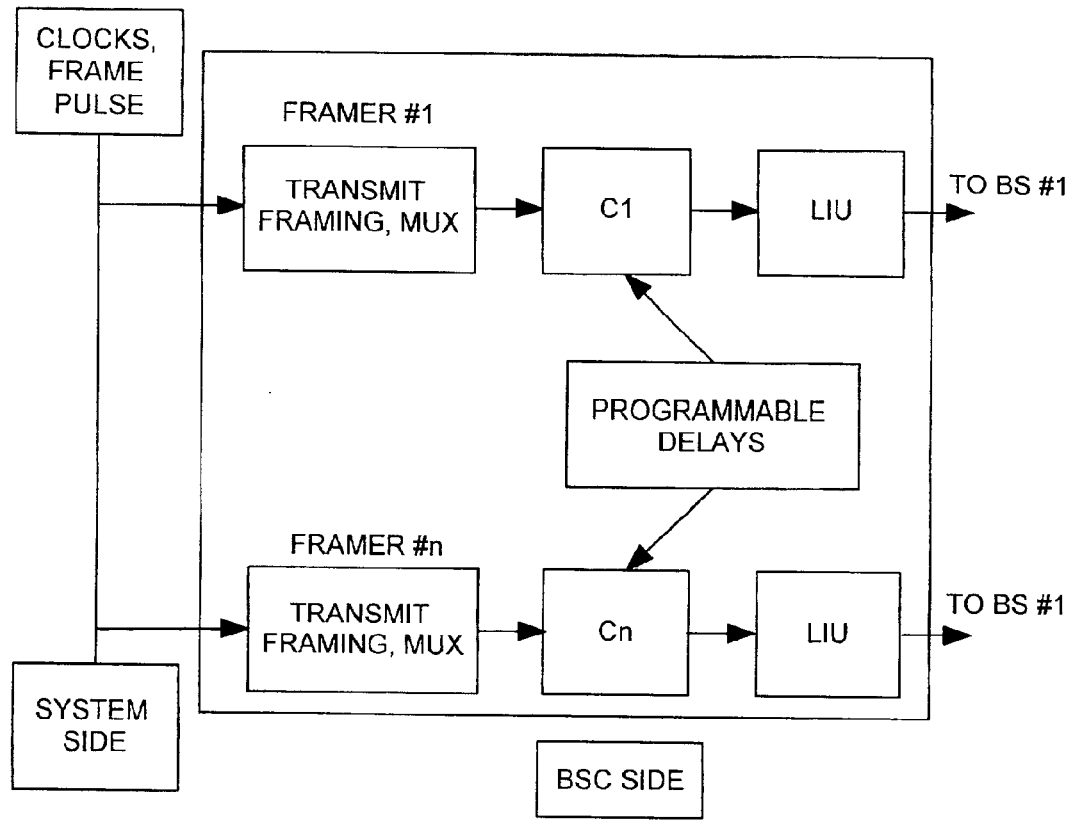
FIG. 5 illustrates in block diagram format, delay compensation within the base station controller.
Figure 6:
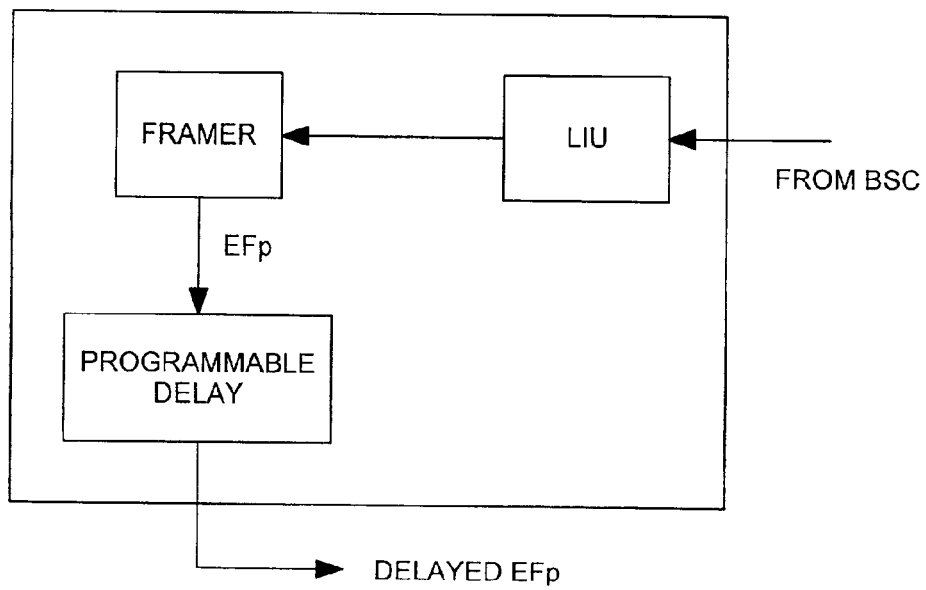
FIG. 6 illustrates in block diagram format, delay compensation in the base station.

The compensation of delay on individual links can be implemented by different methods as illustrated in FIGS. 5 and 6. In FIG. 5 the delays are implemented in the BSC (i.e. the delays are implemented with-in the multi-channel device). In FIG. 6 the delays implemented in the Base stations.

In FIG. 5 a framer for each link contains a programmable delay element whereby the values C1 to Cn are loaded into the delay elements by hardware or software.

In the implementation illustrated in FIG. 6 the Cn value for each base station is transmitted over the Sa bits in HDLC from the BSC to the designated BS. The E1 (T1) receiver in the base station has a built in programmable delay unit. The extracted frame pulse from the BSC is delayed by the value Cn and the delayed frame pulse is then used to drive the Radio.

While particular embodiments of the invention have been described and illustrated it will be apparent to one skilled in the art that numerous changes can be made to the concept without departing from the spirit of the invention. For example, the application of the concept of the present invention can be extended to implementations employing multi-channel T1/JT1 transceivers, multi-channel E3/DS3 and SDH. It is to be understood, however, that such changes will fall within the full scope of the invention as defined by the appended claims.

What is claimed is:

1. A method of measuring and compensating for propagation delay between nodes in a communications network comprising:

transmitting a loop delay measurement signal from a first node to a second node over a communication link using Sa bits of a frame alignment signal (FAS) protocol;

receiving the measurement signal at said second node and returning the signal to the first node together with an embedded value of a turn around delay time determined at said second node;

receiving the measurement signal and embedded turn around time at the first node;

calculating the propagation delay by measuring the total delay time less the turn around time; and adding at said first node a delay component to a timing signal for said second node.

2. The method of claim 1 wherein said first node is a base station controller in a wireless communications network and said second node is a base station.

3. The method of claim 2 wherein there are a plurality of base stations each in communication with said base station controller over separate communication links.

4. The method of claim 3 wherein a separate propagation delay value is calculated for each communication link.

5. The method of claim 4 wherein said measurement signal is a High-Level Data Link Control (HDLC) message.

6. The method of claim 3 wherein said base station controller transmits a frame reference signal having a constant frequency and receives frame synchronization signals from respective base stations, wherein the time between the frame reference signal and the respective frame synchronous signals represents the delay for each base station.

7. A system for measuring and compensating for propagation delay between nodes in a communications network comprising:

a transmitter at a first node for transmitting a loop delay measurement signal from said first node to a second node over a communication link using Sa bits of a frame alignment signal (FAS) protocol;

a receiver at said second node for receiving the measurement signal at said second node and returning the signal to the first node together with an embedded value of a turn around delay time determined at said second node;

receiving means at the first node for receiving the measurement signal and embedded turn around time;

calculation means at the first node for calculating the propagation delay by measuring the total delay time less the turn around time; and delay means at said first node for adding a delay component.

8. The system as defined in claim 7 wherein said delay means adds a programmable delay at said first node.

9. The system as defined in claim 7 wherein said delay means is located at said second node and receives programmable delay information from said first node for use in synchronizing its clock.

* * * * *